C. HAAS.
TIME MEASURING DEVICE.
APPLICATION FILED SEPT. 23, 1918.
1,337,014.
Patented Apr. 13, 1920.
2 SHEETS—SHEET 1.
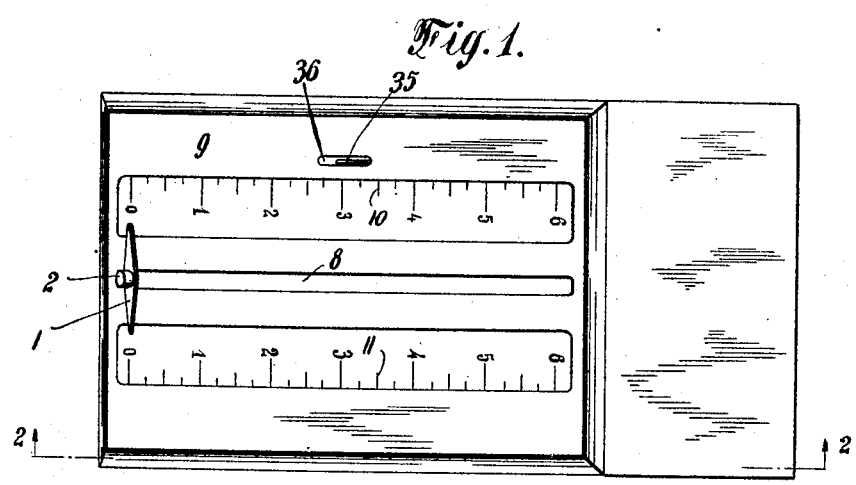
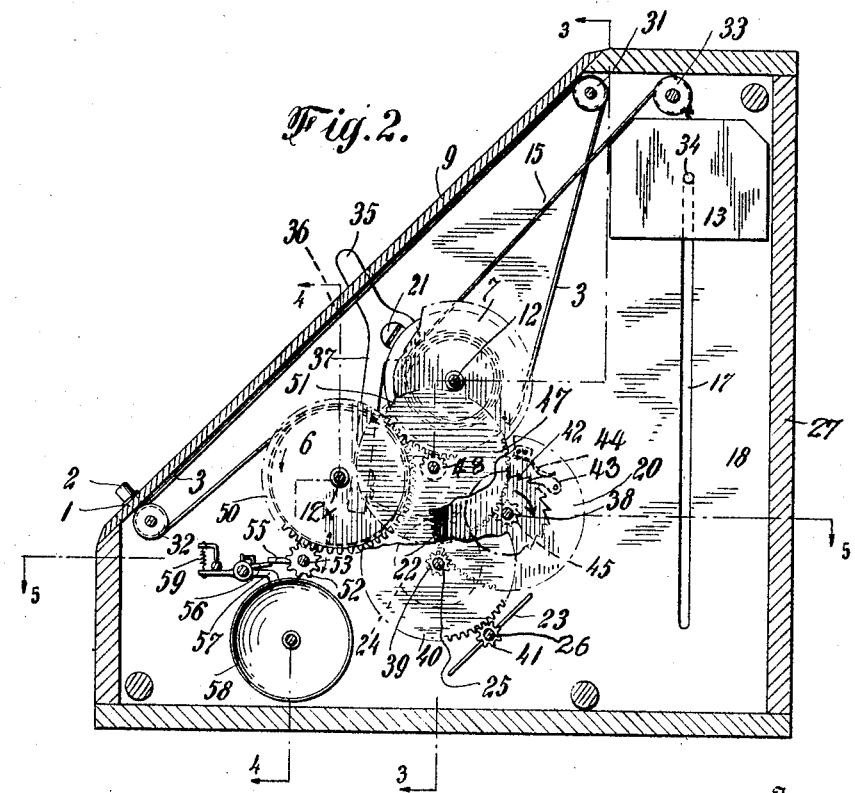
Inventor
Charles Haas.
By his Attorney
William O. Richards

C. HAAS.
TIME MEASURING DEVICE.
APPLICATION FILED SEPT. 23, 1918.

1,337,014.

Patented Apr. 13, 1920.
2 SHEETS—SHEET 2.

Inventor
Charles Haas.
By his Attorney
William D. Richards

UNITED STATES PATENT OFFICE.

CHARLES HAAS, OF BROOKLYN, NEW YORK.

TIME-MEASURING DEVICE.

1,337,014.   Specification of Letters Patent.   Patented Apr. 13, 1920.

Application filed September 23, 1918. Serial No. 255,312.

*To all whom it may concern:*

Be it known that I, CHARLES HAAS, a subject of the Emperor of Germany, residing at New York city, borough of Brooklyn, county of Kings, State of New York, have invented certain new and useful Improvements in Time-Measuring Devices, of which the following is a specification.

The present invention relates to a mechanism or device for indicating time of comparatively short duration, that will show at a glance the lapse of the minutes or fractions of minutes, so that the user can readily ascertain the passing of a predetermined period of time.

The object of this invention is to provide such a device in which an indicating member can be readily returned to its normal position by the user, when advanced, and which operation will restore the potential or power in the actuating mechanism.

In the accompanying drawings illustrating one embodiment of my invention, Figure 1 is a top plan view.

Fig. 2 is a vertical section on the line 2—2 of Fig. 1.

Figure 3:
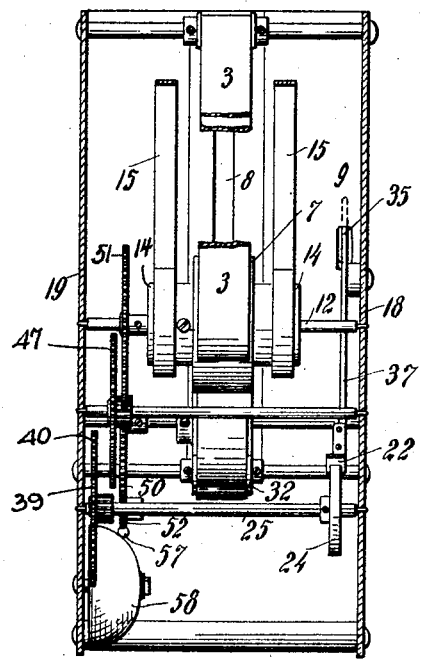
Fig. 3 is a vertical section on the line 3—3 of Fig. 2.
Figure 4:
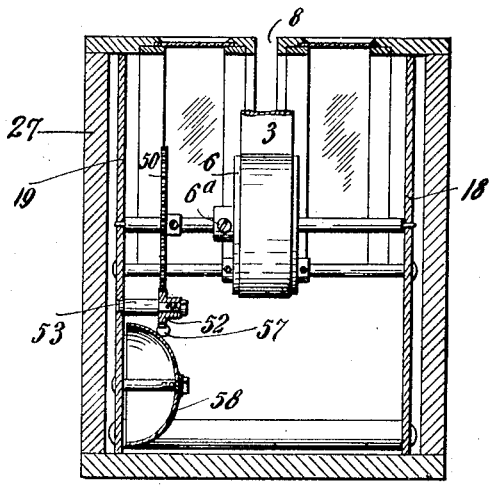
Fig. 4 is a section on the line 4—4 of Fig. 2.
Figure 5:
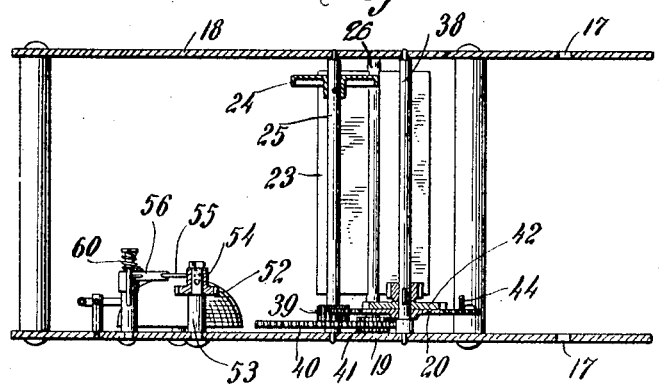
Fig. 5 is a partial longitudinal section on the line 5—5 of Fig. 2.

This invention comprises essentially a movable indicator, that in the present invention is embodied in a movable indicator that advances adjacent a scale; an actuating mechanism is shown in the form of a weight; and a speed governor for controlling the advancement of the indicating member by the falling of the weight. In addition to these elements the invention includes a controlling member that can arrest the falling of the weight and advance of the indicator at any stage; and which controlling member is further provided with means whereby when shifted to release the arrested mechanism, it functions to give an impulse to the arrested mechanism, to bring the moving parts up to the predetermined speed that is controlled by the governor.

As set forth in the drawings, the indicator is in the form of a needle or cross bar 1 that advances in a slot 8 in a suitable casing 27, adjacent a plate 9 of the casing, provided with scales 10 and 11. A knob 2 is fast to the needle 1 for retracting the same.

The needle and knob are carried by a flexible member or tape 3, that passes around guide rollers 31 and 32 adjacent the ends of the slot 8; the ends of which tape are secured to drums 6 and 7 respectively, that are mounted on suitable arbors 12, 12$^x$ rotating in bearings in two side plates 18 and 19, suitably secured in the casing. These drums 6 and 7 are secured to gears 50 and 51 respectively, which gears are in mesh, and the tape ends are connected with the drums so that the tape will wind up on one drum as it unwinds on the other, according to the rotation of the meshing gears. Connected with the drum 7 are drums 14, 14, to which are secured ends of bands 15, 15, that pass around a roller 33, and are secured to a weight 13. The latter is guided for vertical movement by pins 34 that slide in slots 17 in the plates 18 and 19. It will be readily understood that the falling of the weight from the position indicated in Fig. 1, will rotate the drums 14, and also the drums 6 and 7, that will wind up the tape 3 on drum 7, and unwind the other end of the tape from drum 6. This will obviously advance the needle 1 from the lower end of the slot toward its upper end. It will also be apparent that at any stage in this movement the operator can grasp the knob 2 and slide it down, which will reverse the movement of drums 6 and 7, and cause drums 14 to rewind the band 15, and raise the weight 13.

In order to control the advance of the pointer from the descent of the weight, I provide a suitable governor, shown in the form of a fan. A blade or plate 23 is mounted on an arbor 26 journaled in the side plates, and a pinion 41 on this arbor meshes with a gear 40 on an arbor 25. Pinion 39 on arbor 25 meshes with a gear 20 loose on arbor 38. A pinion 45 fast on arbor 38 meshes with a gear 47, carrying a pinion 48 that meshes with the said gear 51 on arbor 12. On arbor 38 is secured a ratchet wheel 42, and a pawl 43 is pivoted on gear 20, and pressed against such ratchet wheel by a spring 44. From this it will be understood that when the weight falls and rotates the gear 51, the gears 47, 48 and 45 will rotate the ratchet wheel 42 clock-wise. This will cause the pawl to turn gear 20 in the same direction, and through gears 39, 40 and 41 will rotate the fan 23. But when the indicator or knob 2 is reversed by the operator to rewind the weight, the ratchet wheel 42 will rotate anti-clock-wise, and pawl 43 will ride free on the ratchet wheel, and the fan will not be rotated.

I further provide means for arresting the mechanism at any stage in the movement of the indicator. On arbor 25 is secured a disk 24, that is engaged by a spring arm 22 fast on an arm 37, pivoted at 21. The arm 35 that forms a bent lever with the arm 37 projects through a slot 36 in the casing, and can be swung by the operator to cause the spring arm 22 to bear strongly on the periphery of the disk 24, and arrest the mechanism. But when the arm 35 is swung to release the mechanism, the spring arm 22 will slide along the periphery of the disk 24, and impart a rotation to the disk of considerable speed. This will set the fan 23 in rapid motion, and bring the parts actuated by the falling weight, up to the predetermined speed at once.

If desired, an alarm may be sounded at intervals of time, and I provide a pinion 52 meshing with the gear 50, which pinion is mounted on post 53, and carries an arm 55 fast on its hub 54. This arm on rotation clock-wise of the pinion 52, trips an arm 56 carrying a clapper 57. The latter when released is swung by spring 59 to strike a bell 58.

In the use of the device, the knob 2 is shifted to the lower end of the slot to wind up the weight, and then the arm 35 swung to cause the spring brake lever to lock the mechanism. When the user desires the device to begin operation, the brake lever is simply shifted, and the fan thereby put in full rotation at once, and the weight will fall and the indicator travel from one end of the scale to the other. As shown this operation may consume six minutes. At any time the user can shift the brake arm and interrupt the movement, and then restart the device by shifting the brake lever. Or the indicator can be returned to normal position at any time, and such operation will restore the actuating mechanism by rewinding the weight.

What I claim is:—

In combination, a pair of drums, gears on the drums that intermesh, a flexible member secured at its ends to said drums respectively, an indicator on said flexible member, a third drum secured to one of said drums, a flexible member secured to the last named drum, a weight carried by the latter flexible member and arranged to rotate all of said drums and advance the flexible member carrying the indicator, and a governor connected with the drums to regulate the speed thereof, said mechanism being so arranged that reverse movement of the indicator will rewind the latter flexible member and elevate the weight, without operating the governor.

In testimony whereof I have signed my name to this specification, this 29th day of May, 1918.

CHARLES HAAS.